US007379862B1

(12) United States Patent
Chang et al.

(10) Patent No.: US 7,379,862 B1
(45) Date of Patent: May 27, 2008

(54) METHOD AND APPARATUS FOR ANALYZING AND DEBUGGING NATURAL LANGUAGE PARSES

(75) Inventors: Su Chin Chang, Woodinville, WA (US); Hajime Wada, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/443,779

(22) Filed: Nov. 19, 1999

(51) Int. Cl.
*G06F 17/27* (2006.01)
(52) U.S. Cl. .......................... 704/9; 717/143; 717/144
(58) Field of Classification Search .................... 704/9, 704/10, 1, 225, 257; 715/531, 532, 533, 715/534; 717/143, 144
See application file for complete search history.

(56) References Cited

U.S. PATENT DOCUMENTS

| 4,816,994 | A | * | 3/1989 | Freiling et al. | ............... | 706/59 |
| 4,914,590 | A | * | 4/1990 | Loatman et al. | ............... | 704/9 |
| 5,060,155 | A | * | 10/1991 | van Zuijlen | ................... | 704/9 |
| 5,225,981 | A | * | 7/1993 | Yokogawa | ...................... | 704/2 |
| 5,297,040 | A | * | 3/1994 | Hu | ................................ | 704/9 |
| 5,721,938 | A | * | 2/1998 | Stuckey | ......................... | 704/4 |
| 5,870,608 | A | * | 2/1999 | Gregory | ......................... | 704/9 |
| 5,966,686 | A | * | 10/1999 | Heidorn et al. | ................ | 704/9 |
| 5,995,922 | A | * | 11/1999 | Penteroudakis et al. | ........ | 704/9 |
| 6,085,029 | A | * | 7/2000 | Kolawa et al. | ............. | 717/132 |
| 6,236,959 | B1 | * | 5/2001 | Weise | ............................. | 704/9 |
| 6,275,791 | B1 | * | 8/2001 | Weise | ............................. | 704/9 |
| 6,473,896 | B1 | * | 10/2002 | Hicken et al. | .............. | 717/132 |
| 6,721,697 | B1 | * | 4/2004 | Duan et al. | ..................... | 704/9 |

OTHER PUBLICATIONS vanNoord, Hdrug. A Flexible and Extendible Development Environment for Natural Language Processing, Proceedings of the EACL/ACL . . . , 1997, pp. 91-98.*

(Continued)

*Primary Examiner*—Patrick N. Edouard
*Assistant Examiner*—Lamont Spooner
(74) *Attorney, Agent, or Firm*—Joseph R. Kelly; Westman, Champlin & Kelly, P.A.

(57) ABSTRACT

A method and apparatus for analyzing and debugging natural language parses is provided. An input sentence is received and parsed by a parsing engine. A table of constituents is retrieved from the parsing engine and a grid tree is drawn representing the input sentence. Nodes of the tree, or connecting points, appear at intersections of the tree "branches." Once the grid has been drawn, the first syntactically correct parse of the sentence is mapped to the grid in a tree-like manner (the "parse tree"). Input is then received for selecting one of several graphical buttons, for selecting a node that is in the parse tree, for selecting a node that is not in the parse tree, or for selecting options from one of several "pull-down" menus. If a connecting point that is not contained in the parse tree is selected, a group of menu options may be displayed adjacent to the selected connecting point. The user may select menu options for displaying successful rules applied at the connecting point, or for displaying unattempted and failed rules for the connecting point. If a connecting point that is contained in the parse tree (i.e. a constituent was formed at the connecting point) is selected, a second group of menu options may be displayed adjacent to the selected connecting point. The menu options may include displaying the name of the connecting point and the name of the rule that was applied at the connecting point to form the constituent.

23 Claims, 11 Drawing Sheets

OTHER PUBLICATIONS

Moot, Grail An Automated Proof Assistant for Categorical Grammer Logistics, Proceedings of the 1998 User Interfaces for Theorem Provers Conference, 1998, p. 1-10.*

Charniak, E., "Statistical Language Learning", Chapter 1.4, MIT Press, 1993.

* cited by examiner

METHOD AND APPARATUS FOR ANALYZING AND DEBUGGING NATURAL LANGUAGE PARSES

TECHNICAL FIELD

The present invention relates to computer systems for natural language processing. More specifically, the present invention relates to computer systems for developing natural language parsing systems. Even more specifically described, the present invention relates to computer systems for analyzing and debugging natural language parses.

BACKGROUND OF THE INVENTION

In order for humans and computers to communicate effectively using natural human languages (i.e. English, Japanese, etc.), computer systems must be developed that can "understand" natural human languages. A starting point toward developing computers that can truly understand natural human languages is the development of computer systems for analyzing human language text. One type of system for analyzing human language text is the natural language parser. Natural language parsers, or simply "parsers," analyze human language text to determine its syntax, or grammatical structure.

Parsing a natural language sentence involves several steps. First, the sentence is broken down into tokens, which may be words or punctuation marks. Next, a dictionary is consulted to determine grammatical information about each word, such as its part of speech (i.e. verb, noun, etc.). Finally, grammar rules are applied to the words and tokens to join them into larger sentence fragments called constituents. The grammar rules are applied recursively to the constituents until the entire sentence may be formed by joining two constituents. For example, the sentence "The dog barked" is comprised of the constituents "The" (adjective phrase), "dog" (noun phrase), and "barked" (verb phrase). Therefore, this sentence may be parsed by first applying a grammar rule that joins an adjective phrase followed by a noun phrase. The result of the application of this rule provides a larger constituent, the noun phrase "The dog." Another grammar rule may then be applied that joins a noun phrase and a verb phrase to create a verb phrase. The application of this grammar rule joins the noun phrase "The dog" with the verb phrase "barked," and results in a grammatically correct parse of the entire sentence.

Parsers typically apply all of the available grammar rules to a sentence using a brute-force algorithm. Therefore, the parser itself is relatively simple to create. In contrast, the grammar rules that the parser applies can be very complicated and must be created by a linguist. When creating grammar rules, a linguist typically asks the question "Given a span of text in a sentence, are there grammar rules that can be applied to form that span into a constituent?" If the answer to this questions is "Yes," the linguist may then ask "What rules were applied to form the span into a constituent, and what is the resulting constituent?" If the parse of a sentence fails, and the parser is unable to form a constituent that spans the entire sentence with the available rules, the linguist may ask the question "Where did application of the grammar rules fail, and why?" The linguist may also ask "Are there rules that could be successfully applied?" In order to answer these and other questions regarding grammar rules, linguists utilize software tools for analyzing and debugging natural language parses.

Previous tools for analyzing and debugging natural language parses have been very difficult to use because of their text-based nature. For instance, some previous tools for analyzing and debugging parses simply display all of the constituents formed during a parse in a text-based list. To determine how a span of text may be joined, a linguist must scan through the entire list of constituents to find all of the constituents that join the span of text. This searching process can be very time consuming and frustrating for the linguist. To apply a grammar rule to two constituents, the linguist must first scan the list for the two constituents they want to join. Then, the linguist must type in a command to apply a rule to the two constituents. The linguist must know beforehand the rule that they want to apply, and either memorize or reference all of the available rules. This process is also very counterintuitive for a linguist and can be extremely time consuming.

Therefore, in light of these problems, there is a need for a method and apparatus for analyzing and debugging natural language parses that permits a linguist to quickly and intuitively analyze and debug the application of grammar rules. There is also a need for a method and apparatus for analyzing and debugging natural language parses that provides quick and easy access to all of the available grammar rules.

SUMMARY OF THE INVENTION

The present invention solves the problems described above by providing a method and apparatus for analyzing and debugging natural language parses that is intuitive and easy-to-use. The present invention advantageously allows linguists, and even non-linguists, to quickly debug the application of grammar rules. The present invention also provides quick and easy access to all of the available grammar rules. The present invention may also be advantageously utilized with a variety of parsing engines, and may be implemented for use with virtually any natural language.

Generally described, the present invention provides a user interface for analyzing and debugging natural language parses. Aspects of the present invention are embodied in an application program for analyzing and debugging natural language parses. Utilizing aspects of the present invention, a user is prompted to provide an input sentence. Once the user has provided the input sentence, the sentence is transmitted an associated parsing engine. As described above, the present invention operates independently of any particular parsing engine and many such parsers may be advantageously utilized with the present invention.

The parsing engine receives the input sentence and parses the sentence in a manner well know to those skilled in the art. The parsing engine then saves the results of the parse in a table of constituents. Once the parser has completed saving the table of constituents, the application program embodying aspects of the present invention retrieves the table of constituents. A "grid" tree is then drawn with as many "leaves" as words in the input sentence. Nodes of the tree, or "connecting points," appear at intersections of the tree "branches." The grid may be drawn in a dashed line and each of the words of the sentence may be displayed under the appropriate leaf.

Once the grid has been drawn, the first syntactically correct parse of the sentence is mapped to the grid in a tree-like manner. Successful connections between sentence fragments, or constituents, may be shown by drawing over the dashed line of the grid with a solid line. The dashed lines of the grid remain visible where no successful connection has been made. An identifier describing the constituents is displayed at each connecting point above two successfully connected constituents. If no parse of the sentence is syntactically correct, the partially formed tree is displayed.

Once the first syntactically correct parse of the sentence has been applied to the grid, user input is received. The user may then provide control input to select user-interface elements, such as graphical buttons, connecting points that are a part of the parse tree, connecting points that are not a part of the parse tree, or options in "pull-down" menus.

Options available to the user may include user-interface controls for selecting the previous or next parse of the input sentence, and for displaying a parse for a previous or next input sentence. Information may also be displayed identifying the current parse and the total number of parses available to be displayed. User interface controls may also be provided for turning the grid on or off depending upon the current state of the grid.

User interface controls may also be provided allowing the user to select a node, or connecting point, on the display. If a connecting point that is not contained in the parse tree (i.e. no constituent could be formed at the connecting point) is selected, a group of menu options may be displayed adjacent to the selected connecting point. The user may select menu options for displaying successful rules applied at the connecting point, or for displaying unattempted and failed rules for the connecting point. If the user selects a menu option for displaying the successful rules, another group of menu options may be displayed adjacent to the first menu providing selections for displaying successful rules for the word string below the connecting point, and for displaying successful rules for the constituents below the connecting point.

If the menu option for displaying successful rules for the word string below the connecting point is selected, another user interface window may be displayed showing the rules that can be applied to the word string without regard to the rules currently in place in the tree. If the menu option for displaying successful rules for the constituents below the connecting point is selected, a user interface window may be displayed showing the rules that can be applied in light of what is contained in the tree below the connecting point. In either case, one of the displayed rules may then be selected and applied to the tree at the selected connecting point.

If one of the connecting points that is not contained in the tree is selected and the menu option for displaying failed and unattempted rules is also selected, a user interface window may be presented displaying the rules that could have been applied to the constituents under the selected connecting point. Input may then be received for applying one of the displayed rules to the selected connecting point, or for computing the success or failure of each of the displayed rules at the connecting point. If the option for computing the success or failure of each of the displayed rules is selected, each of the rules and the constituents of the connecting point are submitted to the parse engine to determine if the rule may be successfully applied at the connecting point. Indicators may then be displayed adjacent to each rule to indicate whether the rule was successfully or unsuccessfully applied at the connecting point. If control input is received selecting one of the displayed rules, the selected grammar rule is then applied at the selected connecting point. If application of the rule at the connecting point fails, another user interface window may be presented indicating that the rule failed, and also highlighting the portion of the rule that failed.

If a connecting point that is contained in the tree (i.e. a constituent was formed at the connecting point) is selected, a group of menu options may be displayed adjacent to the selected connecting point. The menu options may include displaying the name of the connecting point and the name of the rule that was applied at the connecting point to form the constituent. The menu options may also permit displaying detailed information regarding the constituents below the connecting point in a new user interface window, deletion of the selected connecting point and all of its constituents, and deletion of the entire tree.

In this manner, the present invention advantageously provides a method and apparatus for analyzing and debugging natural language parses. That the present invention improves over the drawbacks of the prior art and accomplishes the objects of the invention will become apparent from the detailed description of the illustrative embodiment to follow.

DETAILED DESCRIPTION

Figure 1:
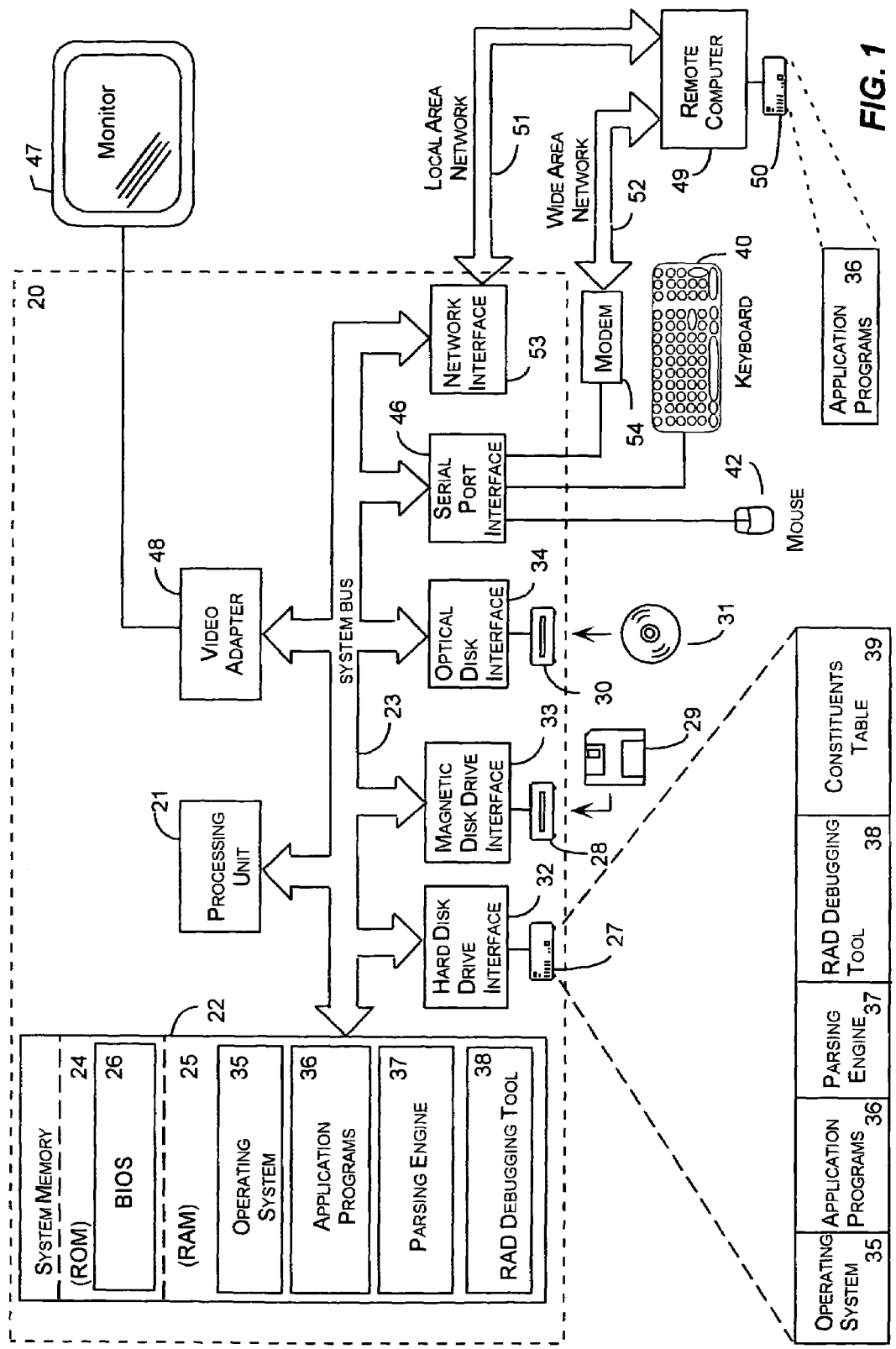
FIG. 1 is a block diagram of a networked personal computer that provides the operating environment for embodiments of the present invention.

The present invention is directed toward a method and apparatus for analyzing and debugging natural language parses. The present invention may be embodied in an application program or in another type of program module. In an illustrative embodiment, the present invention is embodied in a natural language parsing application program called Rapid Analysis and Debugging ("RAD") tool, running on a personal computer for proving a user interface for parsing natural language sentences.

Generally described, RAD provides a user interface for a computer system that greatly reduces the time and effort necessary to analyze and debug natural language parses. More particularly described, RAD provides a tree-like view of natural language sentence parses and permits easy application of new grammar rules to sentence fragments, permits quick deletion of constituents, and allows quick debugging of new grammar rules.

Using the RAD application program, a user is prompted to input a sentence to be parsed. Once the sentence has been received from the user, the sentence is transmitted to a parsing engine. The parsing engine, or parser, then parses the sentence using the available grammar rules (the "grammar") and saves the result of the parse in a table of constituents. The table of constituents contains all of the possible parses of the sentence and describes the rules that were applied to join each pair of constituents.

Once the parser has completed saving the table of constituents, a first parse of the sentence is retrieved from the table of constituents. A grid is then drawn in the shape of a tree representing the sentence. The grid has a connecting point at its top and as many "leaves" as tokens (words or punctuation marks) in the input sentence. Connecting points appear at the intersections of the "branches" of the grid. The grid is drawn by connecting the connecting points with a dashed line, or other identifying line characteristic, and each of the words of the sentence is displayed under the appropriate leaf of the grid.

The grid for any given parse of an input sentence is drawn by first determining the number of tokens in the sentence. The tokens form the "leaves" of the tree and each language defines what a token is. In the English language, a token is usually a word. Once the number of tokens in the input sentence has been determined, the number of connecting points required on the grid is determined. The number of connecting points is equal to the arithmetic sum of the number of leaves of the tree. Therefore, the equation for determining the number of connecting points is equal to: ((number_of_leaves*(number_of_leaves+1))/2). For example, if there are four leaves, then number of connecting points required to draw the grid is ten (4*(4+1))/2=10).

Once the number of connecting points required to draw the grid has been computed, the connecting points are assigned numbers starting with one, from the top down, left to right. Therefore, the connecting point at the top level of the grid would be assigned the number one. The two connecting points immediately below the top connecting point would be numbered two and three (from left to right) and so on. Each row of connecting points is also assigned a level number from the top down, starting with one. Therefore, the top connecting point is at level one, the connecting points immediately below the top connecting point are at level two, and so on. With this numbering scheme in place, equations can be defined to locate child and parent connecting points from any connecting point. In this manner, the grid can be navigated and the grid may be created by drawing lines between the appropriate connecting points. These equations are shown below in Table 1.

LeftChildOf(Connecting Point)=Level(connecting point)+connecting point

RightChildOf(Connecting Point)=Level(connecting pint)+connecting point+1

LeftParentOf(Connecting Point)=connecting point−Level(connecting point)

RightParentOf(Connecting Point)=connecting point−Level(connecting point)+1

Table 1

Once the grid has been drawn, the parse is mapped to the grid by drawing solid lines (or lines with other types of identifying characteristics) between successful connections between sentence fragments, or constituents (the "tree" or "parse tree"). The grid remains visible where no successful connection could be made between constituents in the tree. An identifier describing each constituent may also be displayed at each connecting point above two successfully connected constituents. If the parse of the sentence is not syntactically correct, the partially formed tree will be displayed.

Each constituent in the table of constituents is assumed to contain information about its child constituents. The algorithm for drawing the tree is shown in Table 2 as psuedocode. The algorithm deals with unary connecting points (i.e. connecting points that have no children) by collapsing them. The algorithm in Table 2 takes a constituent as input and returns the connecting point number where the input constituent is drawn. Other methods for drawing the grid and the parse tree will be apparent to those skilled in the art.

```
DrawParse (ThisConstit)
  If ThisConstit is a leaf
    //Get the connecting point connected to the leaf
    ThisConnectingPoint = ConnectingPointConnectedTo
      (ThisConstit);
    //Label the connecting point with the current constit
    LabelConnectingPointWithConstit(ThisConnecting-
      Point, ThisConstit);
    //Return ThisConnectingPoint
  Else If ThisConstit Has 1 Child
    //Draw the child and label the connecting point of the
      child
    //with ThisConstit (collapses the unary node)
    ThisConnectingPoint    =    DrawParse(LeftConstitOf
      (ThisConstit));
    LabelConnectingPointWithConstit(ThisConnecting-
      Point, ThisConstit);
    Return ThisConnectingPoint;
  Else If ThisConstit Has 2 Children
    //Draw the left and right child constituents
    LeftChildConnectingPoint =
    DrawParse(LeftConstitof(ThisConstit));
    RightChildConnectingPoint =
    DrawParse(RightConstitof(ThisConstit));
    //Determine the common parent connecting point of the
      child
    //subtrees. This common connecting point will be the
      connecting
    //point of ThisConstit
    ThisConnectingPoint = CommonParent(LeftChildCon-
      nectingPoint,
    RightChildConnectingPoint);
    //Connect the subtrees to this Connecting Point
    ConnectConnectingPints(ThisConnectingPoint,
    LeftChildConnectingPoint);
    ConnectConnectingPints(ThisConnectingPoint,
    RightChildConnectingPoint);
    //Label the connecting point with the current constit
    LabelConnectingPointWithConstit(ThisConnecting-
      Point,
    ThisConstit);
    ReturnThisConnectingPoint
  End If
```

Table 2

Once the tree has been drawn in the manner described above, control input is received. Control input may comprise input from an input device such as a mouse, keyboard, light pen, or other similar input device known to those skilled in the art. Through the control input, one of several graphical user interface selections may be made. For instance, a node contained in the parse tree may be selected, a node that is not in the parse tree may be selected, or other options may be selected from "pull-down" menus, user interface buttons, or other similar user interface items as known to those skilled in the art.

Through the present invention, control input may be received for selecting a next parse of the sentence or a previous parse of the sentence. If control input is received selecting the previous parse of the sentence, the grid and parse tree are redrawn in the manner described above for the next parse of the sentence. Likewise, if control input is received selecting the next parse of the sentence, the grid and parse tree is redrawn for the next available parse of the sentence. The number of the current parse and the total number of available parses may also be displayed. Control input may also be received for turning the grid on or off.

Control input may also be received selecting a next sentence or a previous sentence. If control input is received selecting the previous sentence, the parse of the current sentence will be removed and the previously entered sentence will be transmitted to the parsing engine and displayed in the manner described above. Likewise, if control input is received selecting the next sentence, the parse of the current sentence will be removed and the next available sentence will be transmitted to the parsing engine and displayed in the manner described above. In this manner, parses for multiple sentences may be displayed quickly and conveniently.

Control input may also be received selecting a connecting point at which a constituent was not successfully formed (i.e. constituents could not be formed at the connecting point, so the connecting point is not contained in the parse tree). If control input is received selecting such a connecting point, a first group of menu items are displayed proximate to the selected connecting point. Control input may then be received selecting the menu items. In particular, menu items may be selected for displaying rules applied to successfully form a constituent at the selected connecting point, or for displaying rules that either failed or that were not attempted at the selected connecting point.

If control input is received selecting a menu item for displaying rules applied to successfully form a constituent at the selected connecting point, a second group of menu items may be displayed proximate to the first group of menu items. Control input may then be received selecting one of the menu items from the second group of menu items. More particularly, menu items may be selected for displaying the successful rules for joining the word string below the connecting point or for displaying the successful rules for joining the constituents below the connecting point.

If control input is received for displaying the successful rules for the word string, a window is displayed showing the rules that can be applied to the word string below the selected connecting point without regard to the rules that were previously applied to the tree. If control input is received for displaying the successful rules for the constituents below the selected connecting point, a window is displayed showing the rules that can be applied in light of what is in the tree below the selected connecting point. In either case, control input may be received selecting one of the displayed rules, and the selected rule may then be applied to the tree at the selected connecting point.

If control input is received for displaying rules that either failed or that were not attempted at the selected connecting point, a window is displayed showing all of the rules that could have been applied to the constituents under the selected connecting point. Control input may then be received to apply one of the displayed rules to the connecting point or to compute the success or failure of each of the rules at the selected connecting point.

Control input may also be received selecting a connecting point at which a constituent was successfully formed (i.e. constituents were formed at the connecting point, so the connecting point is contained in the parse tree). If control input is received selecting such a connecting point, a menu may be displayed adjacent to the selected connecting point. The menu may display information regarding the name of the connecting point and the name of the rule that was applied to join the constituents below the connecting point. Control input may then be received selecting one of the menu items for viewing details regarding the constituents below the selected connecting point, for deleting the connecting point and all of its constituents from the tree, and for deleting all of the connecting points contained in the tree. Also, if control input is received indicating that a selection pointer is "hovering" over a connecting point that is contained in the tree, a "tool-tip" may displayed displaying the rule that was applied at that connecting point.

ILLUSTRATIVE OPERATING ENVIRONMENT

Although the illustrative embodiment will be generally described in the context of an application program running on a personal computer, those skilled in the art will recognize that the present invention may be implemented in conjunction with operating system programs or with other types of program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client server manner. Examples of such distributed computing environments include local area networks and the Internet.

The detailed description that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, compute servers, and memory storage devices. Each of these conventional distributed computing components is accessible by the processor via a communication network.

The processes and operations performed by the computer include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read-only memory.

Referring now to the drawings, in which like numerals represent like elements throughout the several figures, aspects of the present invention and the illustrative operating environment will be described.

FIG. 1 and the following discussion are intended to provide a brief, general description of a suitable computing environment in which the invention may be implemented. Referring now to FIG. 1, an illustrative environment for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media are readable by a computer, such as magnetic cassettes, flash memory cards, digital video disks, Bernoulli cartridges, and the like, may also be used in the illustrative operating environment.

A number of program modules may be stored in the drives and RAM 25, including an operating system 35 and one or more application programs 36, such as a program for analyzing and debugging natural language parses. In the illustrative embodiment of the present invention, aspects of the present invention may also be stored in RAM 25 as parsing engine 37 and RAD debugging tool 38. A table of constituents 39 may also be stored in RAM and on hard disk drive 27 by parsing engine 37.

A user may enter commands and information into the personal computer 20 through a keyboard 40 and pointing device, such as a mouse 42. Other control input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers. The personal computer 20 may be capable of displaying a graphical user interface on monitor 47.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are illustrative and other means of establishing a communications link between the computers may be used.

As discussed earlier, the illustrative embodiments of the present invention are embodied in an application program module for analyzing and debugging natural language parses. The operating system 35 generally controls the operation of the previously discussed personal computer 20, including input/output operations. In the illustrative operating environment, the invention is used in conjunction with Microsoft Corporation's "Windows 98" operating system. However, it should be understood that the invention can be implemented for use in other operating systems, such as Microsoft Corporation's "WINDOWS 3.1," "WINDOWS 95", "WINDOWS NT" and "WINDOWS 2000" operating systems, IBM Corporation's "OS/2" and "AIX" operating systems, SunSoft's "SOLARIS" operating system used in workstations manufactured by Sun Microsystems, Hewlett-Packard's "HP-UX" and "RT-UX" operating systems, and the operating systems used in "MACINTOSH" computers manufactured by Apple Computer, Inc.

ILLUSTRATIVE EMBODIMENTS OF THE PRESENT INVENTION

Figure 5A:
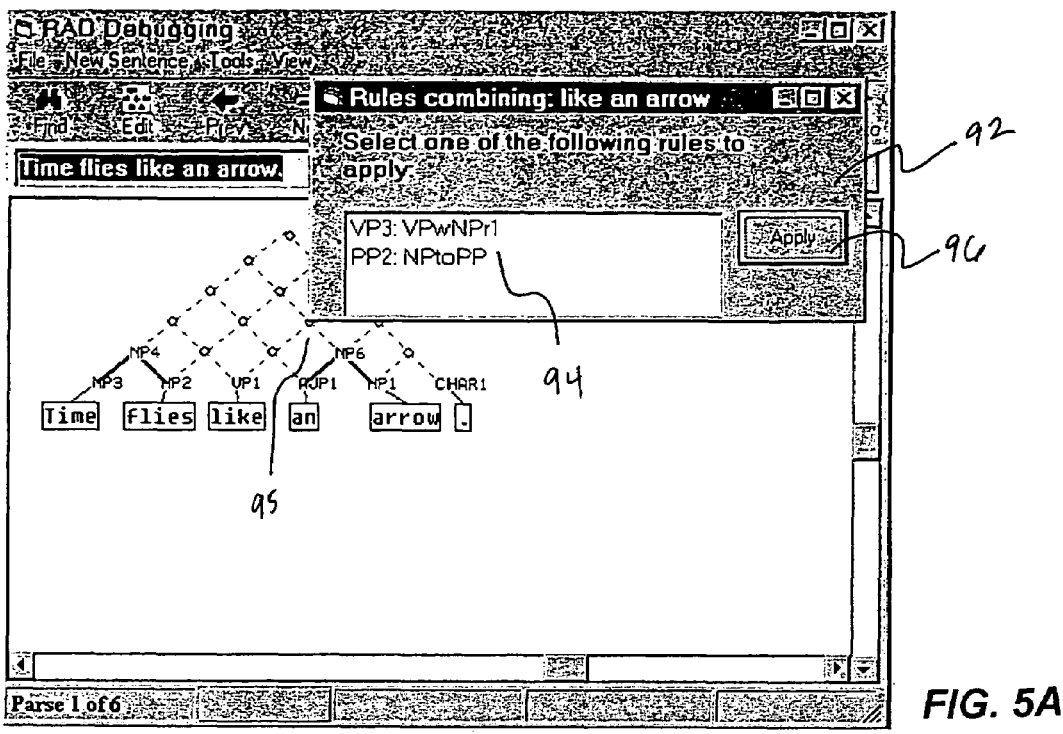
FIGS. 5A and 5B are screen shots of a software application program for analyzing and debugging natural language parses that embodies aspects of the present invention.
Figure 5B:
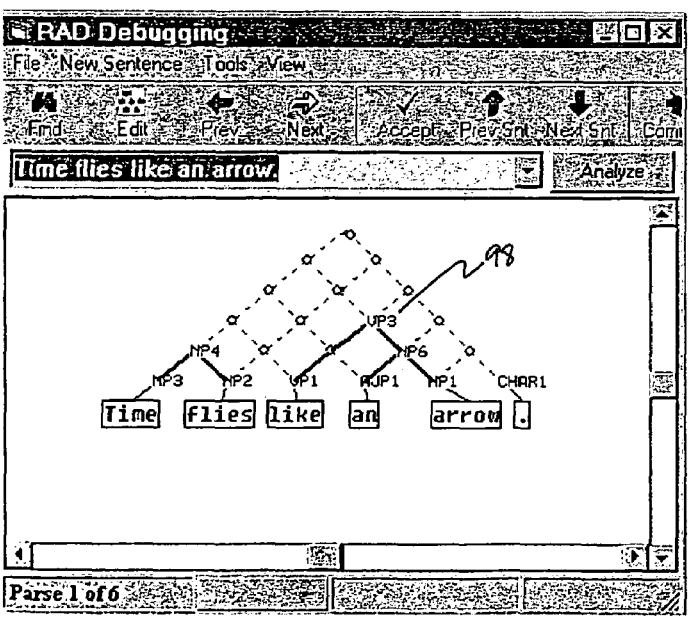
Figure 6:
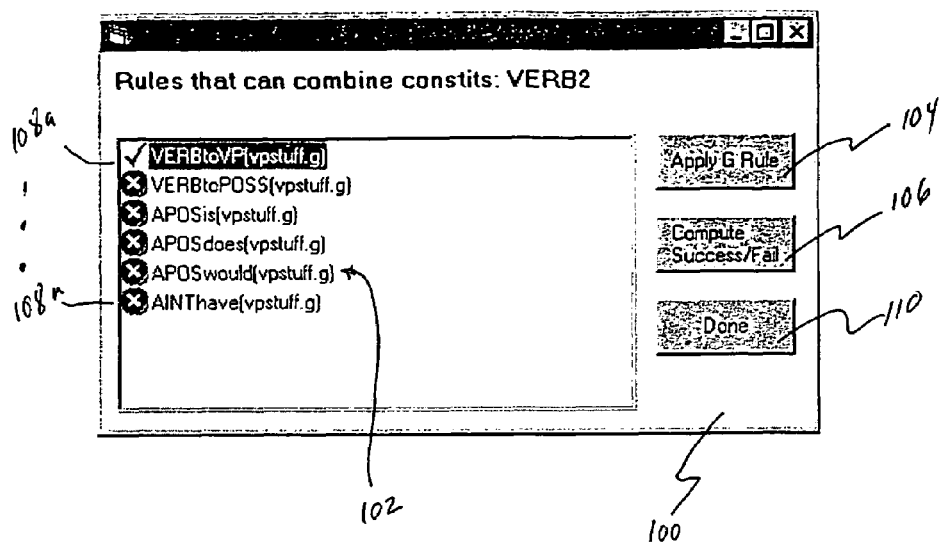
FIG. 6 is a screen shot of a software application program for analyzing and debugging natural language parses that embodies aspects of the present invention.
Figure 7:
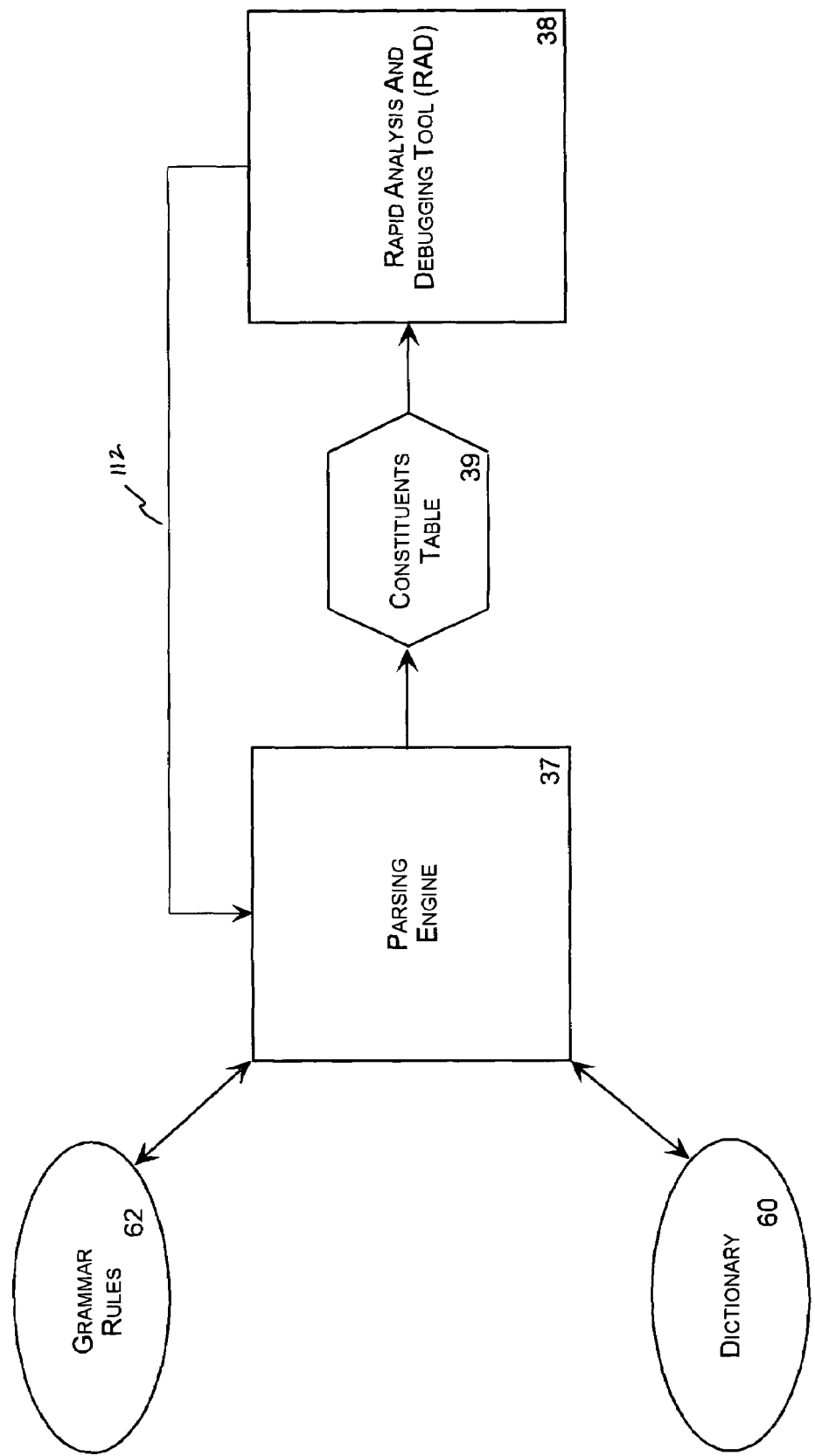
FIG. 7 is a block diagram illustrating an illustrative software architecture for implementing aspects of the present invention.
Figure 8:
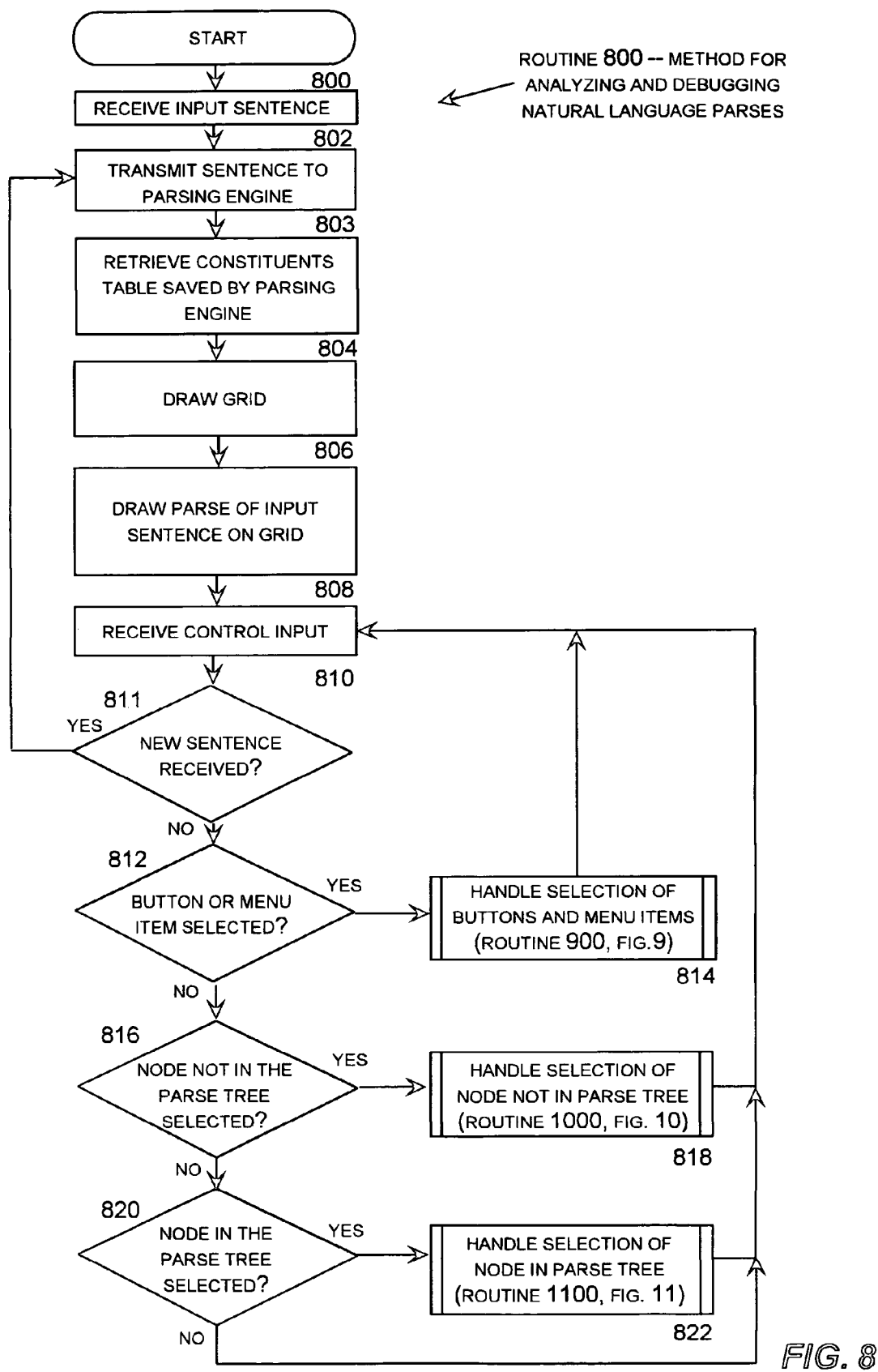
FIG. 8 is a flow diagram illustrating an illustrative method for analyzing and debugging natural language parses.
Figure 9:
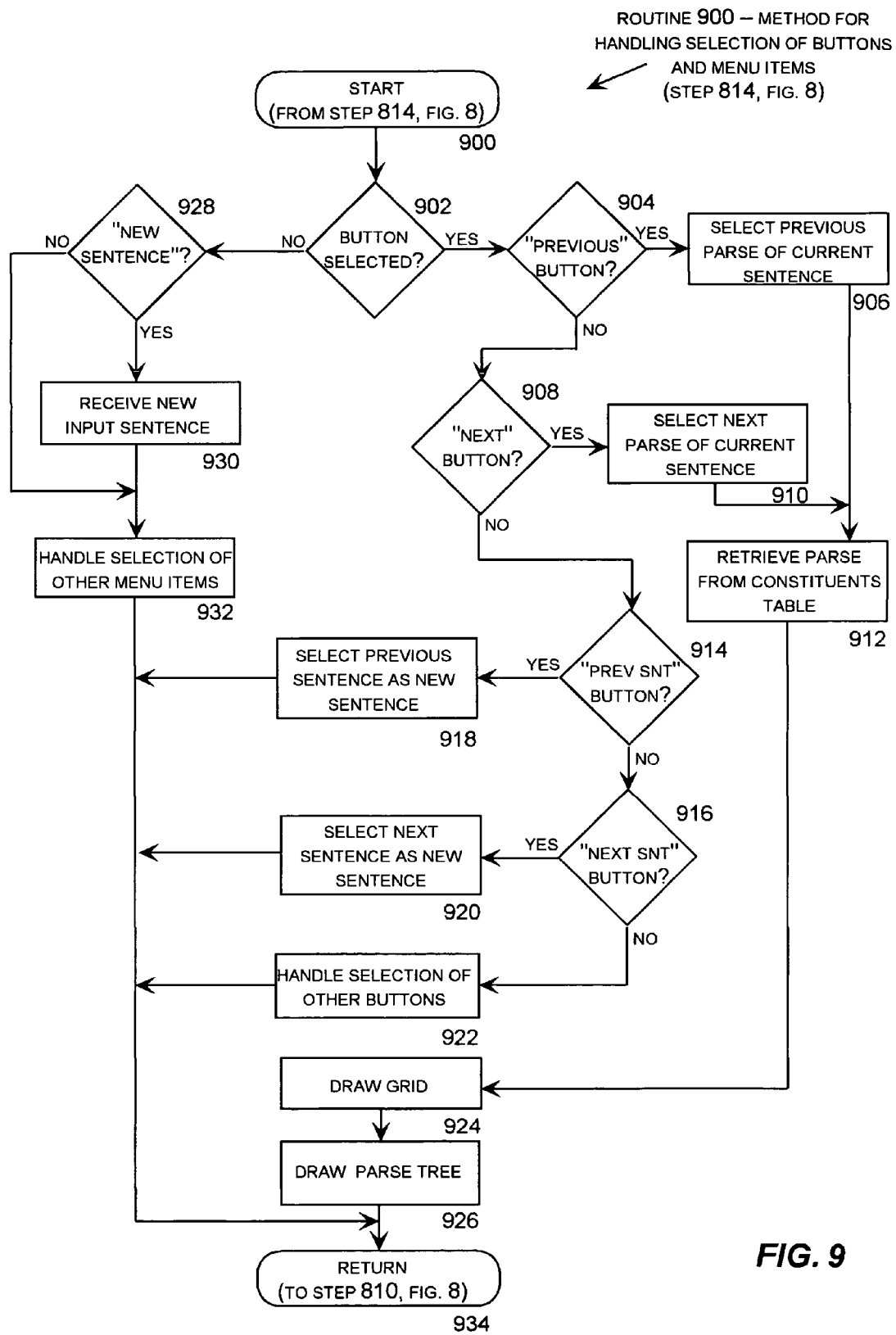
FIG. 9 is a flow diagram that illustrates a method for handling the selection of buttons, display items, and other user interface controls.
Figure 10:
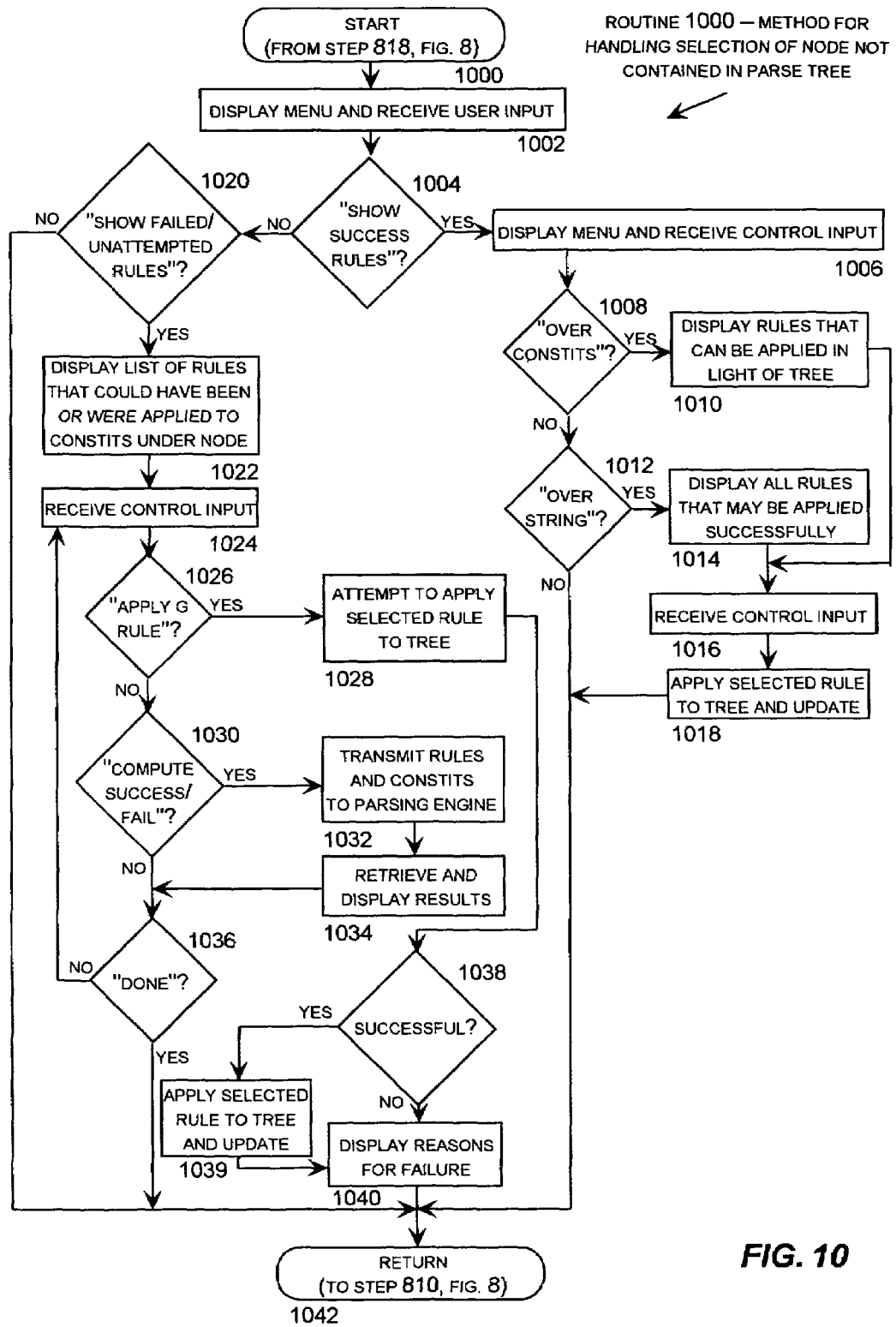
FIG. 10 is a flow diagram showing an illustrative method for handling the selection of a connecting point not contained in a parse tree.

With the above preface on the illustrative operating environment for embodiments of the present invention, the remaining FIGS. 2-10 illustrate aspects of several embodiments of the present invention. FIGS. 2-6 are screen shots of a software application program for analyzing and debugging natural language parses that embodies aspects of the present invention. FIG. 7 is a block diagram illustrating an illustrative software architecture for implementing aspects of the present invention. FIG. 8 is a flow diagram illustrating an illustrative method for analyzing and debugging natural language parses. FIG. 9 is a flow diagram that illustrates a method for handling the selection of buttons, display items, and other user interface controls. FIG. 10 is a flow diagram showing an illustrative method for handling the selection of a connecting point not contained in a parse tree. FIG. 1 is a flow diagram illustrating an exemplary method for handling the selection of a connecting point contained in a parse tree.

Figure 2:
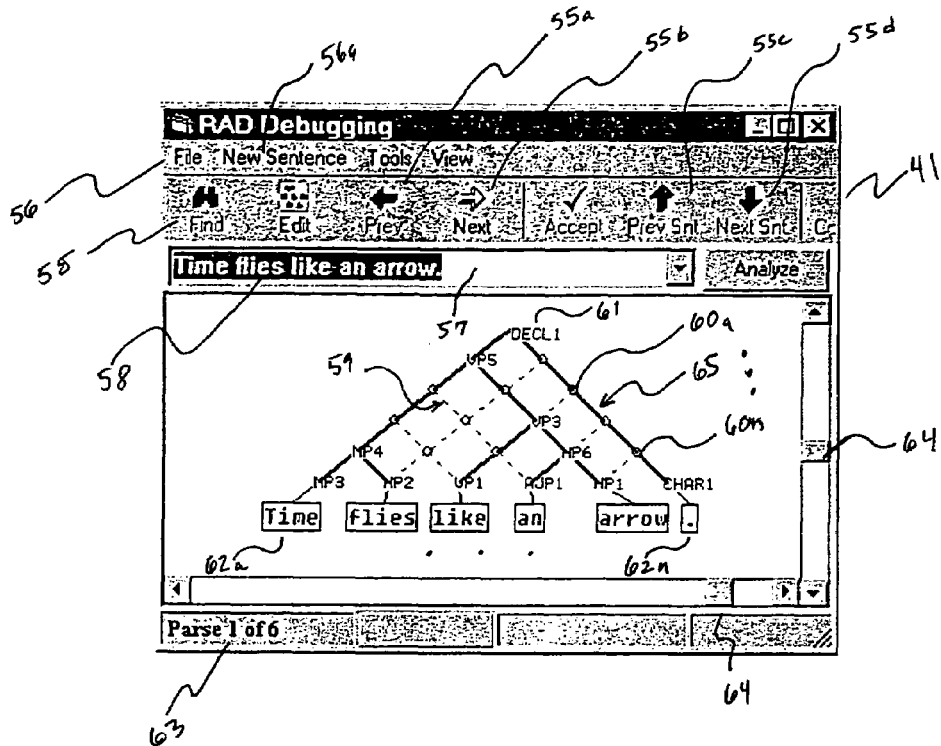
FIG. 2 is a screen shot of a software application program for analyzing and debugging natural language parses that embodies aspects of the present invention.

Referring now to FIG. 2, an illustrative application program embodying aspects of the present invention will be described. FIG. 2 is a screen shot of a user interface window 41 displayed by the rapid analysis and debugging ("RAD") application program 38. The RAD application program 38 embodies aspects of the present invention that may be and utilized by linguists and others to debug natural language parses. The user interface window 41 displayed by the RAD application program 38 comprises a number of user interface buttons 55, such as previous parse button 55a, next parse button 55b, previous sentence button 55c, and next sentence button 55d. As will be described in more detail below, selection of the previous or next parse buttons 55a or 55b will result in the parse for the previous or next sentence to be displayed. Likewise, selection of previous sentence button 55c or next sentence button 55d will result in the selection of the previous or next sentence, respectively, and a display of the appropriate parse for the selected sentence. The user interface window 41 displayed by the RAD application program 38 also comprises user interface menu items such as new sentence menu item 56a. If new sentence menu item 56a is selected the user will be prompted to input a new sentence for parsing.

The user interface window 41 displayed by the RAD application program 38 further comprises input box 57 for receiving input sentence 58. For example, the input sentence "time flies like an arrow" may be input by a user by typing into input box 57. After input sentence 58 has been provided, the parse of input sentence 58 will be displayed in the user interface window 41 by RAD application program 38.

When input sentence 58 has been provided, a tree-like grid 59 is displayed. The grid 59, comprises a plurality of connecting points 60a-60n. In an illustrative embodiment of the present invention, connecting points 60a-60n are connected with dashed lines to distinguish grid 59 from parse tree 65. Parse tree 65 comprises a parse of input sentence 58 and is drawn in solid black lining or other distinguishing lines. Parse tree 65 is described in more detail below.

Rule identifier 61 is displayed at each of connecting points 60a-60n where a constituent was formed. Each of sentence tokens 62a-62n are also displayed below grid 59. Each of sentence tokens 62a-62n corresponds to one of connecting points 60a-60n on the bottom level of grid 59. Information identifying the displayed parse such as parse identifier 63, may also be displayed. Additionally, window controls 64 may be provided to expand or contract the viewing area of the user interface window 41 displayed by the RAD application program 38.

Figure 3:
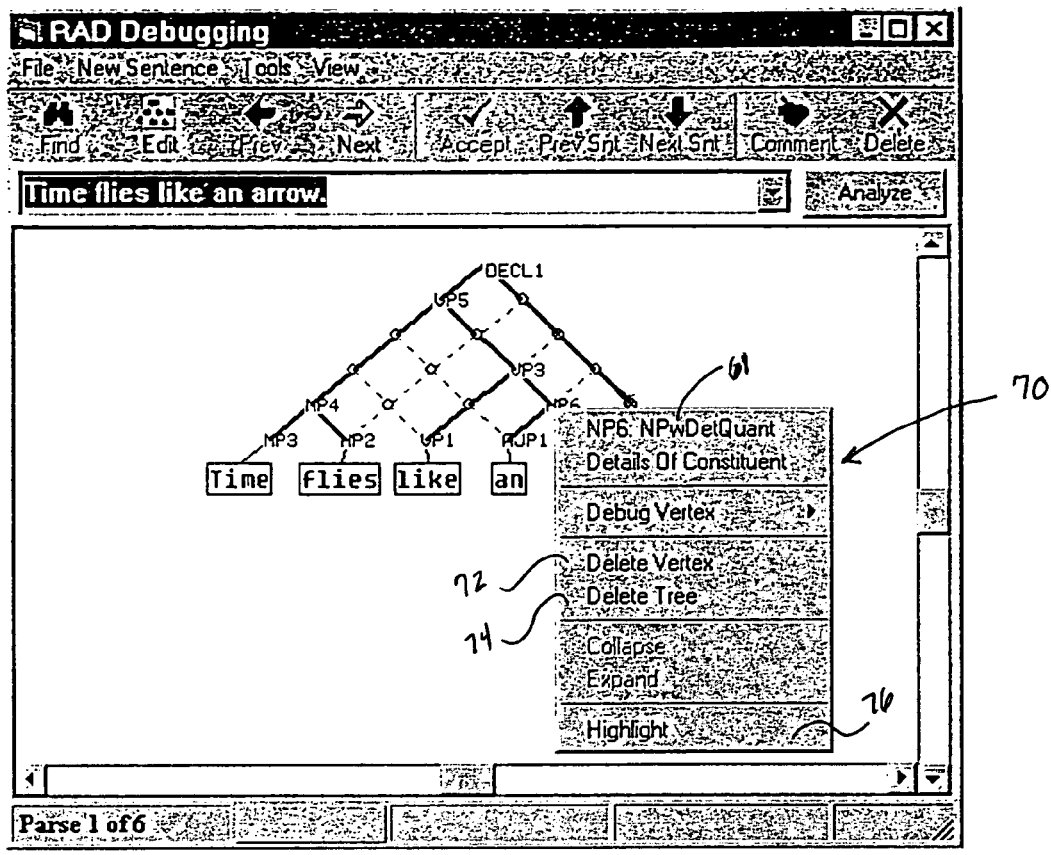
FIG. 3 is a screen shot of a software application program for analyzing and debugging natural language parses that embodies aspects of the present invention.

Referring now to FIG. 2 and FIG. 3, additional aspects of the RAD application program 38 will be described. If RAD application program 38 receives control input selecting one of connecting points 60a-60n that is contained in parse tree 65, a debug menu 70 is displayed proximate to the selected connecting point. Debug menu 70 comprises a plurality of menu items for debugging the selected connecting point. Illustrative menu items include the delete vertex 72 menu item which, when selected, deletes the constituents, or children, of the selected control point and any dependent constituents. Other illustrative menu items include delete tree 74 menu item which, when selected, deletes the entire parse tree 65. Highlight 76 menu item may also be selected to highlight the constituents of the selected control point. Additionally, rule identifier 61 may be provided as part of the debug menu 70, and additional information may be provided describing the rule applied at the selected connecting point.

Figure 4:
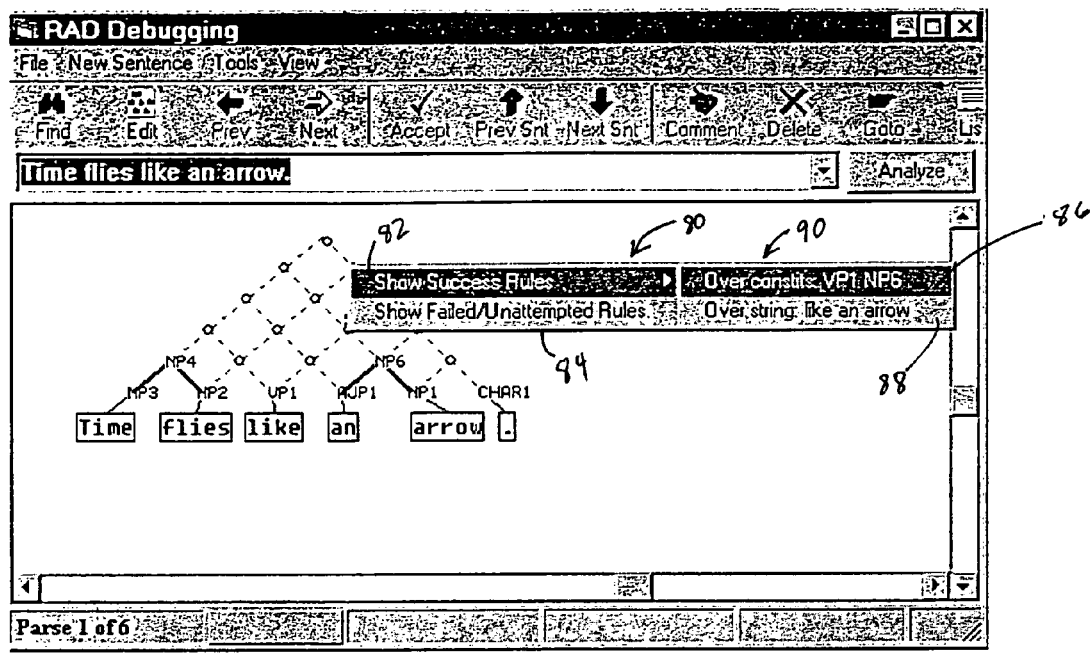
FIG. 4 is a screen shot of a software application program for analyzing and debugging natural language parses that embodies aspects of the present invention.

Referring now to FIG. 2 and FIG. 4, analyze menu 80 is displayed in response to the selection of one of connecting points 60a-60n not contained in parse tree 65. Analyze menu 80 is displayed adjacent to the selected connecting point 60a-60n. Analyze menu 80 provides a plurality of menu items for analyzing grammar rules applied at the selected connecting point 60a-60n.

In illustrative embodiment, menu item 84 is provided for displaying information regarding rules that were applied at the selected connecting point and failed, and also for displaying rules that were not attempted at the selected connecting point. Selection of menu item 84 results in the display of an additional user interface menu identifying each of the rules that failed or were unattempted at the selected connecting point 60a-60n. Selection of menu item 84 is described in more detail below with reference to FIG. 6.

Menu item 82 is also provided for displaying information regarding rules that could be successfully applied at the selected connecting point 60a-60n. If control input is received selecting menu item 82, a second, or supplemental, menu 90 is displayed proximate to analyze menu 80. Supplemental menu 90 contains menu items for displaying the successful rules that could be applied successfully to the constituents under the selected connecting point 60a-60n, and for displaying the rules that could be applied successfully to the string under selected connecting point 60a-60n. If the over constituents 86 menu item is selected, a group of rules is displayed comprising all of the rules that may be applied at the selected connecting point 60a-60n in view of the constituents of the selected connecting point 60a-60n. If the over string 88 menu item is selected, a group of rules is displayed comprising all of the rules that may be applied at the selected connecting point 60a-60n without regard to the constituents of the selected connecting point 60a-60n. Selection of these menu items 86 and 88 is described in more detail below with respect to FIG. 5a.

Referring now to FIG. 4 and FIG. 5a, rules window 92 is displayed in response to selecting either of menu items 86 or 88. Rules window 92 comprises a list of rules 94, that may be applied at the selected connecting point 60a-60n. If menu item 86 was selected, group of rules 94 will comprise all of the rules that may be applied at the selected connecting point in view of the constituents of the selected connecting point 60a-60n. If menu item 88 was selected, group of rules 94 will comprise all of the rules that may be applied at the selected connecting point without regard to the constituents of the selected connecting point. Control input may then be received selecting one of the list of rules 94. Additional control input may be received selecting apply button 96 and the selected rule may then be applied to the parse tree at the selected connecting point. The application of selected rule "VP3" to connecting point 95 is shown in FIG. 5b. Through the application of rule "VP3" at connecting point 95, a constituent 98 is formed comprising the sentence fragment "like an arrow." Grammar rules may be applied and reapplied to connecting points in this manner to create constituents spanning the entire input sentence 58.

Referring now to FIG. 2 and FIG. 6, failed rule window 100 will be described. As discussed above with respect to FIG. 4, failed rule window 100 is displayed in response to the selection of menu item 84 for showing failed or unattempted rules. Failed rule window 100 comprises list of rules 102 that includes all of the grammar rules that either were not applied at the selected connecting point 60a-60n, or that were applied at the selected connecting point 60a-60n and failed. Each of the rules contained in list of rules 102 may be selected by control input, such as a mouse, keyboard, or other input means. Apply button 104 may also be selected via control input to apply a selected grammar rule to the selected connecting point 60a-60n. Success/fail button 106 may also be selected to determine the success or failure of each of list of rules 102.

In response to the selection of success/fail button 106, success/failure indicators 108a-108n may be displayed adjacent to list of rules 102. Done button 110 may also be selected to return to the main RAD application program 38 display screen.

Referring now to FIG. 7, an illustrative software architecture for implementing aspects of the present invention will be described. In an embodiment of the present invention, RAD application program 38 communicates with parsing engine 37 over communication link 112. Communication link 112 may comprise pipes, queues, or other software communication protocols well known to those skilled in the art. RAD application program communicates input sentence 58 to parsing engine 37, and instructs parsing engine 37 to parse input sentence 58.

Parsing engine 37 then parses input sentence 58 through the use of algorithms well known to those skilled in the art. Parsing engine 37 may reference grammar rules 62 or dictionary 60 during the parsing process. When parsing engine 37 has completed the parse of input sentence 58, constituent table 39 is saved by parsing engine 37. Constituent table 39 comprises all of the possible parses of input sentence 58 using the available grammar rule 62. Methods for implementing parsing engine 37 and constituent table 39 well known to those skilled in the art. RAD application program 38 utilizes data saved in constituent table 39 to draw parse tree 65 in the manner described above.

Referring now to FIG. 8, an illustrative Routine 800 for analyzing and debugging natural language parses will be described. Routine 800 begins at step 802 where an input sentence is received. As discussed above, the input sentence may be in any natural language. At step 803 the input sentence is transmitted to parsing engine 37 for parsing in a manner well known to those skilled in the art. As described above with reference to FIG. 7, parsing engine saves the results of the parse in a constituents table. At step 804, the constituents table is retrieved.

From step 804, Routine 800 continues to step 806 where a grid is drawn in the manner described above. At step 808, a parse tree is displayed for the input sentence on the grid. At step 810, control input is received. Control input may comprise input from any number of input devices such as a mouse, keyboard, light pen or other input device. Control input may also be received under programmatic control.

From step 810, Routine 800 continues to step 811 where a determination is made as to whether a new sentence was received. If a new sentence was received, Routine 800 branches to step 803, where the new sentence is transmitted to the parsing engine. If a new sentence was not received, Routine 800 continues to step 812.

At step 812, a determination is made as to whether control input was received selecting a button or menu item. If a button or a menu item was selected, Routine 800 branches to step 814. The handling of the selection of buttons and menu items at step 814 is described in detail below with respect to FIG. 9. From step 814, Routine 800 continues to step 810 where control input is again received. If a determination is made that control input was not received selecting a button or menu item, Routine 800 continues to step 816.

At step 816, a determination is made as to whether control input has been received selecting a connecting point that is not in the parse tree as a selected connecting point. If a determination is made that a connecting point not in the parse tree has been selected, the routine 800 branches to step 818. The handling of the selection of connecting points not contained in the parse tree is described in more detail below with respect to FIG. 10. Step 818 continues to step 810 where additional control input may be received. If, at step 816, a determination is made that a connecting point not in the parse tree has not been selected, the routine 800 continues to step 820.

At step 820, a determination is made as to whether a connecting point that is a part of parse tree has been selected. If a determination is a made that a connecting point not in the parse tree has been selected, routine 800 branches to step 822. At step 822, the selection of a connecting point contained in the parse tree is processed. Handling of the selection of connecting points contained in the parse tree is described in more detail below with respect to FIG. 11. If, at step 820, it is determined that a connecting point not in the parse tree has not been selected, Routine 800 continues to step 810 where control input may again be received.

Referring now to FIG. 9, an illustrative Routine 900 for handling the selection of user interface buttons and menu items will be described. Routine 900 begins at step 902 where a determination is made as to whether control input has been received selecting a user interface button. If a determination is made at step 902 that a user interface button has been selected, Routine 900 branches to step 904.

At step 904, a determination is made as to whether control input has been received indicating that a previous parse of the input sentence should be displayed. If, at step 904, a determination is made that a previous parse of the input sentence should be displayed, Routine 900 branches to step 906. At step 906, the previous parse of input sentence is selected. Routine 900 then continues to step 912 where the selected parse is retrieved from a table of constituents.

If, at step 904, a determination is made that a previous button has not been selected, routine 900 continues to step 908 where a determination is made as to whether control input has been received selecting a user interface button for selecting the next parse of the input sentence. If such a determination is made, routine branches to step 910, where the next parse of the input sentence is selected. Routine 900 then continues to step 912. If, at step 908, it is determined that the user interface button for selecting the next parse of the input sentence has not been selected, Route 900 continue to step 914.

At step 914, a determination is made as to whether control input has been received selecting a user interface button for selecting a previous input sentence. If it is determined that such a user interface selection has been made, Routine 900 branches to step 918, where a previous sentence is selected as the input sentence. Routine 900 then continues to step 934. If, at step 914, it is determined that a user interface selection for selecting a previous input sentence has not been made, Routine 900 branches to step 916.

At step 916, a determination is made as to whether control input has been received selecting a user interface control for selecting a next sentence as the input sentence. If such a determination is made, Routine 900 branches to step 920 where the next sentence is selected as an input sentence. If, at step 916, it is determined that a user interface selection for selecting the next sentence has not been made, Routine 900 continues to step 922. At step 922, additional user interface buttons or menu items may be processed. Routine 900 then continues to step 934, where it ends.

From step 912, Routine 900 continues to step 924 where the grid is drawn as described above. From step 924, the Routine 900 continues to step 926 where the parse tree is drawn in the manner described above.

If, at step 902, it is determined that control input has not been received selecting a user interface button, Routine 900 branches to step 928. At step 928 a determination is made as to whether control input has been received selecting a user interface control for selecting a new sentence. If it is determined that a new sentence control has been selected, Routine 900 branches to step 930 where a new input sentence is received. If it is determined at step 928 that a new sentence control has not been selected, Routine 900 branches to step 932 where the selection of additional menu items may be processed. Routine 900 then returns to step 810, which is described above with reference to FIG. 8.

Referring now to FIG. 10, an illustrative Route 1000 for handling the selection of a connecting point not contained in the parse tree will be described. Routine 1000 begins at step 1002, where a group of menu items are displayed and control input is received. As described above, the group of menu items may be displayed adjacent to the selected connecting point. Routine 1000 continues from step 1002 to step 1004, where a determination is made as to whether control input has been received selecting one of the menu items for displaying a group a rules applied at the selected connecting point to successfully form a constituent. If it is determined at step 1004 that a menu item for displaying successful rules has been selected, Routine 1000 branches to step 1006.

At step 1006, a second menu is displayed and control input is received. As described above, the second menu may be displayed adjacent to the first menu. Routine 1000 then continues from 1006 to step 1008.

A determination is made at step 1008 as to whether control input has been received selecting one of the second group of menu items for displaying a group of grammar rules that may be applied at the selected connecting point in view of the constituents of the selected connecting point. If a determination is made that such a menu item has been selected, Routine 1000 branches to 1010. At step 1010 a group of roles is displayed comprising all of the rules that may be applied at the selected connecting point in view of the constituents of the selected connecting point. Routine 1000 then branches to step 1016, described below.

If, at step 1008, a determination is made that control input has been received selecting a menu item for displaying rules that may be applied at the selected connecting point in view of the constituents of the selected connecting point, Routine 1000 continues to step 1012. At step 1012, a determination is made as to whether one of the menu items has been selected for displaying a group of rules that may be applied at the selected connecting point without regard to the constituents of the selected connecting point. If a determination is made that such a menu item has been selected, Routine 1000 branches to step 1014.

All of the rules that may not be applied successfully at the selected connecting point without regard to the constituents of this selected connecting point are displayed at step 1014. Routine 1000 then continues from step 1014 to step 1016, where control input is received. From step 1016, Routine 1000 continues to step 1018 where any selected rule from the displayed group of rules is applied to the parse tree at the selected connecting point. The parse tree is then updated. Routine 1000 then continues to step 1042 where the routine returns to step 810, described above with reference to FIG. 8.

If, at step 1004, it is determined that control input has been received selecting a menu items for displaying a group of successfully applied rules at the selected connecting point, Routine 1000 continues to step 1020. At step 1020, a determination is made as to whether control input has been received to selecting a menu item for displaying a group of rules not applied at the selected connecting point, or a group of rules applied at the selected connecting point that did not successfully form a constituent. If such a selection has not been made, Routine 1000 continues to step 1042. If such a menu item has been selected, Routine 1000 continues from step 1020 to step 1022.

At step 1022, a list of rules is displayed that unsuccessfully applied at the selected connecting point. A group of rules that were not applied at the selected connecting point may also be displayed. Routine 1000 continues from step 1022 to step 1024, where control input is received. Control input at step 1024 may include the selection of one of the displayed rules.

Routine 1000 continues from step 1024 to step 1026, where a determination is made as to whether control input has been received indicating that one of the selected rules should be applied at the selected connecting point. If such a selection is made, Routine 1000 branches to step 1028 where an attempt is made to apply the selected rule to the parse tree at the selected connecting point. Routine 1000 then continues from step 1028 to step 1038, where determination is made as to whether application of the selected rule was successful at the selected connecting point. If application of the rule was successful, Routine 1000 branches from step 1038 to step 1042. If application of the rule at step 1028 was unsuccessful, Routine 1000 branches from step 1038 to step 1040, where reasons for the failure of the application of the selected rule may be displayed. Routine 1000 then continues to step 1042.

If, at step 1026, it is determined that control input was received for applying a selected rule, Routine 1000 continues to step 1030. At step 1030, a determination is made as to whether control input has been received for determining the computation of the success or failure of each of the rules in the displayed list of rules. If such control input has been received, Routine 1000 branches to step 1032, where all of the rules in the displayed list of rules are transmitted to a parsing engine along with the constituents of the selected connecting point. Routine 1000 then continues from step 1032 to step 1034, where the results of the parse are retrieved and displayed. As described above, successfully applied rules may be indicated with a checkmark or other indicator, and unsuccessful rules may be displayed with an "x" or other similar indicator. Any of the displayed rules may also be selected for application at the selected connecting point. Routine 1000 then continues from step 1034 to step 1036.

If, at step 1030, it is determined that control input was received requesting the computation of the success or failure of the displayed list of rules, Routine 1000 continues to step 1036. At step 1036, a determination is made as to whether control input has been received indicating that the user is done. If such control input is not received, Routine 1000 branches from step 1036 to step 1024. If such control input is received, Routine 1000 continues from step 1036 to step 1042. At step 1042, Routine 1000 returns to step 810, described above with reference to FIG. 8.

Figure 11:
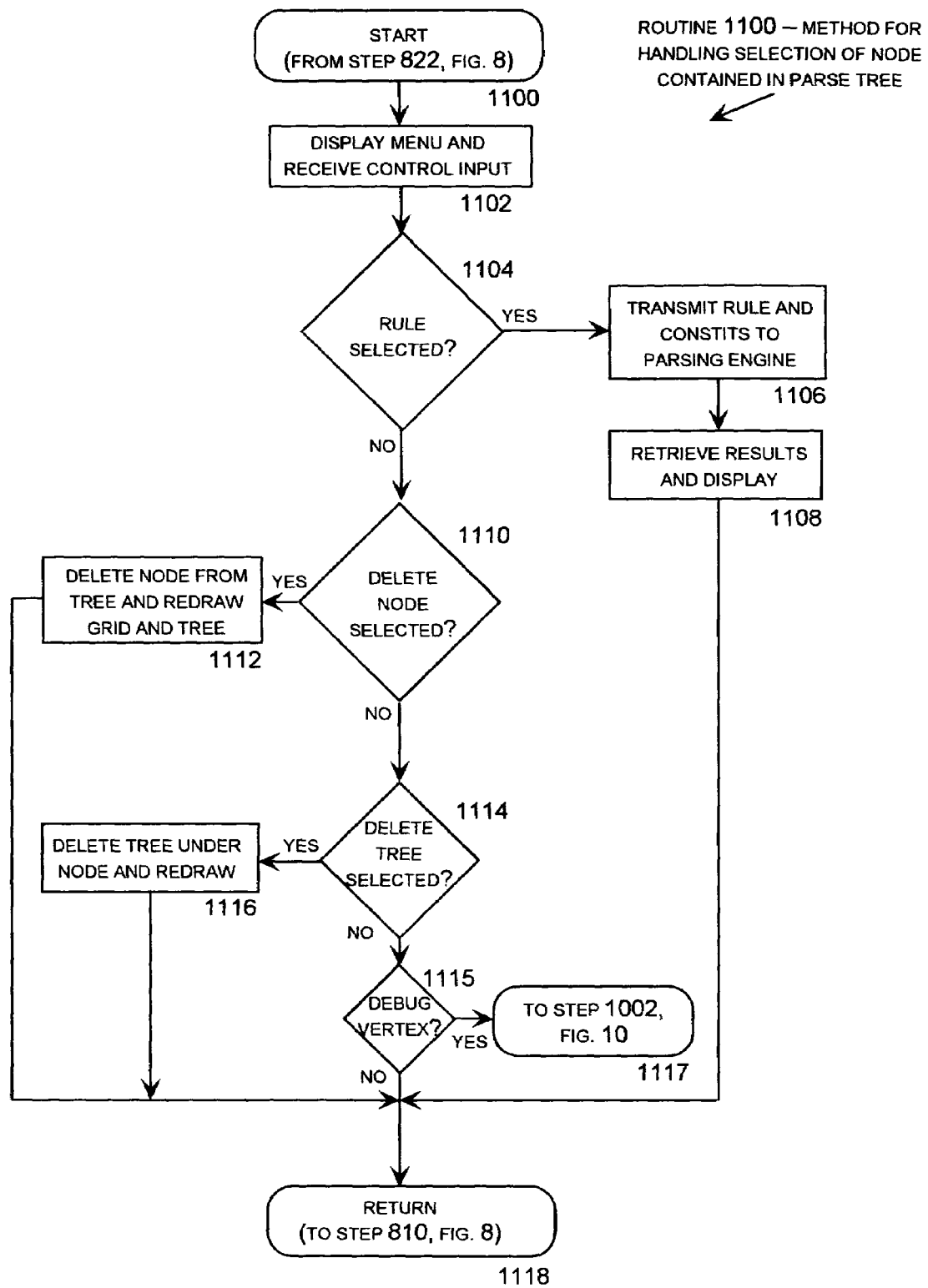
FIG. 11 is a flow diagram illustrating an exemplary method for handling the selection of a connecting point contained in a parse tree.

Referring now to FIG. 11, an illustrative method for handling the selection of a connecting point contained in the parse tree will be described. Routine 1100 begins at step 1102 where a group of menu items is displayed and control input is received. As described above, the group of menu items may be displayed proximate to the selected point. Displaying the group of menu items may also comprise displaying information identifying a rule applied at the selected connecting point to form the constituent below the selected connecting point. Control input may comprise selection of the rule or selection of one of the other menu items using a mouse or other input device.

From step 1102, Routine 1100 continues to step 1104, where a determination is made as to whether control input has been received selecting the displayed rule at the selected connecting point. If control input has been received selecting the rule applied at the selected connecting point, Routine 1100 branches to step 1106. At step 1106, the selected rule and the constituents of the selected connecting point are transmitted to the parsing engine. Routine 1100 then continues from step 1106 to step 1108, where the results of the application of the selected rule at the selected connecting point are retrieved and displayed. Step 1108 then continues to step 1118.

If, at step 1104, it is determined that control input has not been received selecting the rule applied at the selected connecting point, Routine 1100 continues to step 1110. At step 1110, a determination is made as to whether control input has been received selecting one of the menu items for deleting the selected connecting point from the parse tree. If such a menu item has been selected, Routine 1100 branches to step 1112, where the connecting point is deleted from the parse tree. The grid and parse tree are then re-drawn. Step 1112 then continues to step 1118.

If, at step 1110, it is determined that control input has not been received for deleting the selected connecting point, Routine 1100 continues to step 1114. At step 1114, a determination is made as to whether control input has been received selecting one of the menu items for deleting the entire parse tree. If such control input has been received, Routine 1100 branches to step 1116, where the entire parse tree is deleted. The grid and the tree are then re-drawn. step 1116 then continues to step 1118.

If, at step 1114, it is determined that control input has not been received for deleting the entire parse tree, Routine 1100 continues to step 1118. Where Routine 1100 returns to step 810, described above in connection with FIG. 8.

In view of the foregoing, it will be appreciated that the present invention provides a method and apparatus for analyzing and debugging natural language parses. It should be understood that the foregoing relates only to specific embodiments of the present invention, and that numerous changes may be made therein without departing from the spirit and scope of the invention as defined by the following claims.

What is claimed is:

1. A method for analyzing and debugging natural language parses, comprising the steps of:
   displaying a parse tree for a textual input, the parse tree being generated based on rules and comprising at least one connecting point having two children;
   receiving control input selecting one of said connecting points as a selected connecting point;
   determining whether a rule was applied to form a constituent at said selected connecting point, the constituent representing at least the two children joined together; and
   if the determination is positive, displaying a plurality of display items proximate to said selected connecting point, the display items including alternate rules applicable at the selected connecting point to generate constituents, other than the rule used in generating the constituent at the selected connecting point.

2. The method of claim 1, further comprising the step of:
   receiving control input selecting one of said plurality of display items for deleting said constituent formed at said selected connecting point; and
   in response to receiving said control input for deleting said constituent, deleting said constituent.

3. The method of claim 2, further comprising the steps of:
   receiving control input selecting one of said plurality of display items for deleting said parse tree; and
   in response to receiving said control input for deleting said parse tree, deleting constituents formed at each connecting point in said parse tree.

4. The method of claim 3, further comprising the steps of:
   receiving control input selecting one of said plurality of display items for displaying information regarding said children of said selected connecting point; and
   displaying information regarding said children of said selected connecting point.

5. The method of claim 4 wherein said step of displaying a first plurality of display items further comprises displaying information identifying a grammar rule comprising one of the rules applied at said selected connecting point to form said constituent.

6. The method of claim 1, wherein said control input selecting one of said connecting points as a selected connecting point comprises:
   receiving input from an input device placing a pointer of a user interface proximate to one of said connecting points; and
   receiving input representing an enabled state for the control of the input device.

7. A computer-readable medium having computer-executable instructions for performing the steps recited in claim 1.

8. A computer-controlled apparatus for implementing the method of claim 1.

9. The method of claim 1, wherein said step of determining whether a constituent was formed at said selected connecting point comprises determining whether a rule was successfully applied at said selected connecting point to form a constituent between said children of said selected connecting point.

10. The method of claim 1 wherein if the determination is positive, the method further comprises:
    determining that a given rule if applied to the selected connecting point would be unsuccessful in generating the constituent; and
    including the given rule in the alternate rules.

11. The method of claim 1 wherein the alternate rules comprise rules not applied to the selected connecting point in generating the constituent.

12. A method for analyzing and debugging natural language parses, comprising the steps of:
- displaying a parse tree, generated by applying grammar rules, for an input text comprising at least one connecting point having two children;
- receiving control input selecting one of said connecting points as a selected connecting point;
- determining whether a rule was applied to successfully form a constituent, formed by joining at least the two children, at said selected connecting point; and
- displaying a first plurality of menu items proximate to said selected connecting point, the menu items including an alternate grammar rules display item which, when activated, displays alternate grammar rules, other than the rule used in generating the constituent at the selected connecting point, comprising displays alternate grammar rules, other than the rule used in generating the constituent at the selected connecting point, comprising grammar rules for generating constituents that are alternates to the rule applied in generating the constituent formed at the selected connecting point in the parse tree.

13. The method of claim 12, further comprising the steps of:
- receiving control input selecting one of said first plurality of menu items for displaying a group of rules applied to successfully form a constituent at said selected connecting point; and
- in response to receiving user input selecting said menu item for displaying rules applied to successfully form a constituent at said selected connecting point, displaying a second plurality of menu items proximate to said first plurality of menu items.

14. The method of claim 13, further comprising the steps of:
- receiving control input activating the alternate grammar rules display items for displaying a group of alternate rules applied at said selected connecting point that did not successfully form a constituent at said selected connecting point; and
- displaying the group of alternate rules.

15. The method of claim 12 wherein said children comprise constituents of said selected connection point, and further comprising the steps of:
- receiving control input activating the alternate grammar rules display item for displaying a group of alternate rules that were not applied at said selected connecting point but that may be applied in view of said constituents of said selected connecting point; and
- displaying the group of alternate rules.

16. The method of claim 12 wherein said children comprise constituents of said selected connecting point, and further comprising the steps of:
- receiving control input activating the alternate grammar rules display item for displaying a group of alternate rules that were not applied at said selected connecting point without regard to said constituents of said selected connecting point; and
- displaying the group of alternate rules.

17. The method of claim 16, further comprising the steps of:
- receiving control input selecting a rule from the alternate grammar rules as a selected rule; and
- applying said selected rule at said selected connecting point and updating said parse tree.

18. A computer-readable medium having computer-executable instructions for performing the steps recited in claim 17.

19. A computer-controlled apparatus for implementing the method of claim 17.

20. The method of claim 17, further comprising the steps of:
- determining whether said application of said selected rule at said selected connecting point was successful; and
- in response to determining that said application of said selected rule was unsuccessful, displaying information identifying the reasons for the failure of said application of said selected rule.

21. The method of claim 16, further comprising the steps of:
- receiving control input requesting the computation of the success or failure of each of said displayed group of alternate rules;
- in response to said receiving control input requesting the computation of the success or failure of each of said displayed group of alternate rules, transmitting each rule in said displayed group of alternate rules to a parsing engine;
- retrieving an associated success or failure indicator for each of said rules in said displayed group of alternate rules from said parsing engine; and
- displaying said success or failure indicators.

22. A computer-readable medium having computer-executable instructions for performing the steps recited in claim 21.

23. A computer-controlled apparatus for implementing the method of claim 21.

* * * * *